United States Patent [19]
Watts et al.

[11] 3,709,450
[45] Jan. 9, 1973

[54] CARGO LOADING SYSTEM FOR AIRCRAFT

[75] Inventors: John F. Watts; John M. Lang; Alden D. Simonson, all of Bellevue; Raymond S. Nomura, Seattle, all of Wash.

[73] Assignee: The Boeing Company, Seattle, Wash.

[22] Filed: Dec. 11, 1970

[21] Appl. No.: 97,201

[52] U.S. Cl....................................244/118, 214/84
[51] Int. Cl. .............................B64c 1/20, B64d 9/00
[58] Field of Search..........244/118; 214/84; 198/127

[56] References Cited

UNITED STATES PATENTS 3,262,588  7/1966  Davidson................................214/84
3,447,665  6/1969  Egeland.............................214/84 X

*Primary Examiner*—Edward A. Sroka
*Attorney*—Glenn Orlob and Kenneth W. Thomas

[57] ABSTRACT

The invention relates to an aircraft on-board, semiautomatic, baggage container and cargo pallet handling system utilizing a powered wheel drive system in combination with a cargo guide and restraint system for handling the weight of loaded full or half width sized contoured baggage containers and cargo pallets in loading and unloading operations for reducing aircraft turn around time.

4 Claims, 31 Drawing Figures

PATENTED JAN 9 1973 3,709,450

INVENTORS
JOHN F. WATTS
JOHN M. LANG
BY ALDEN D. SIMONSON
RAYMOND S. NOMURA

Glenn Orlob
AGENT

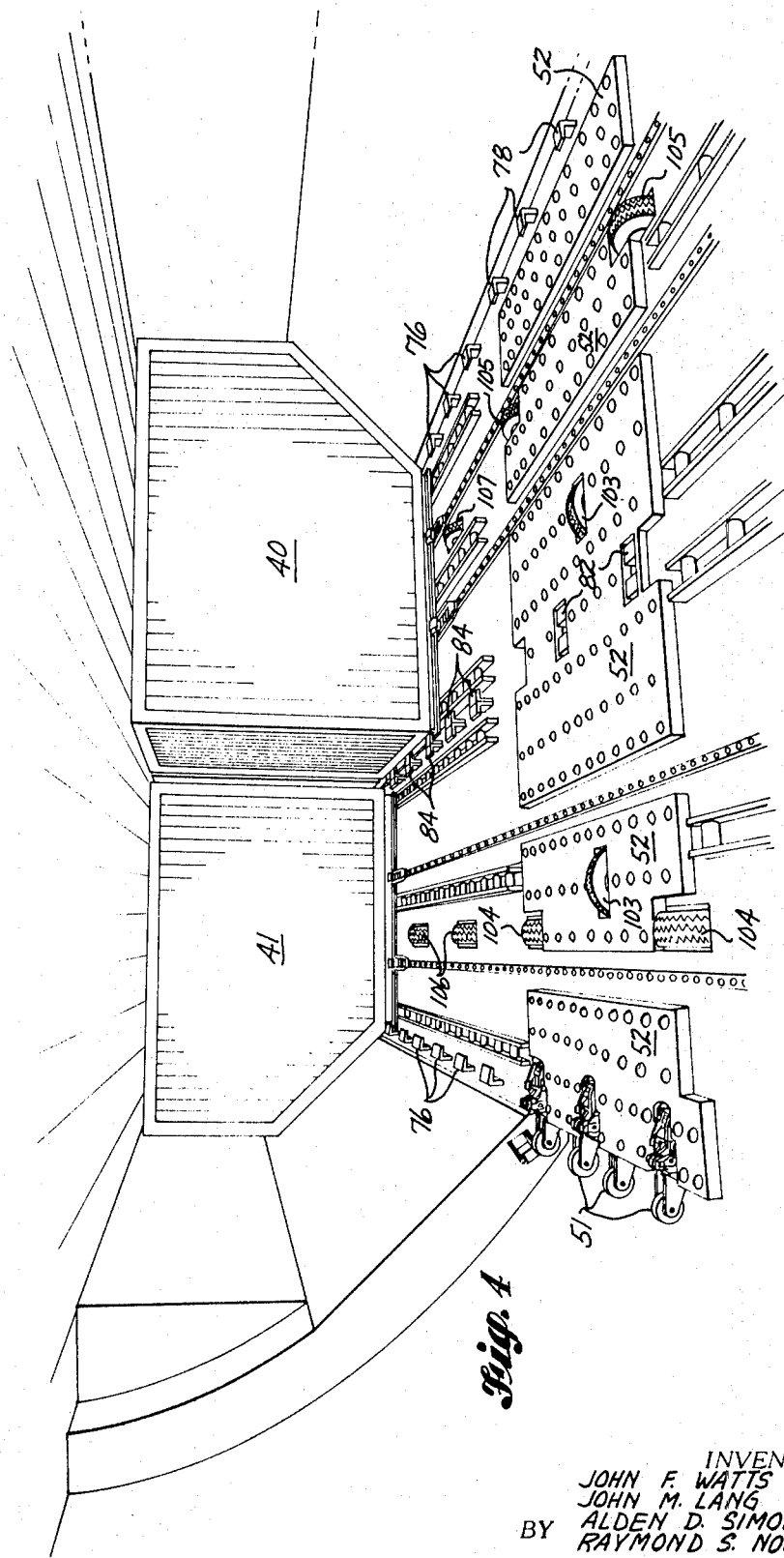

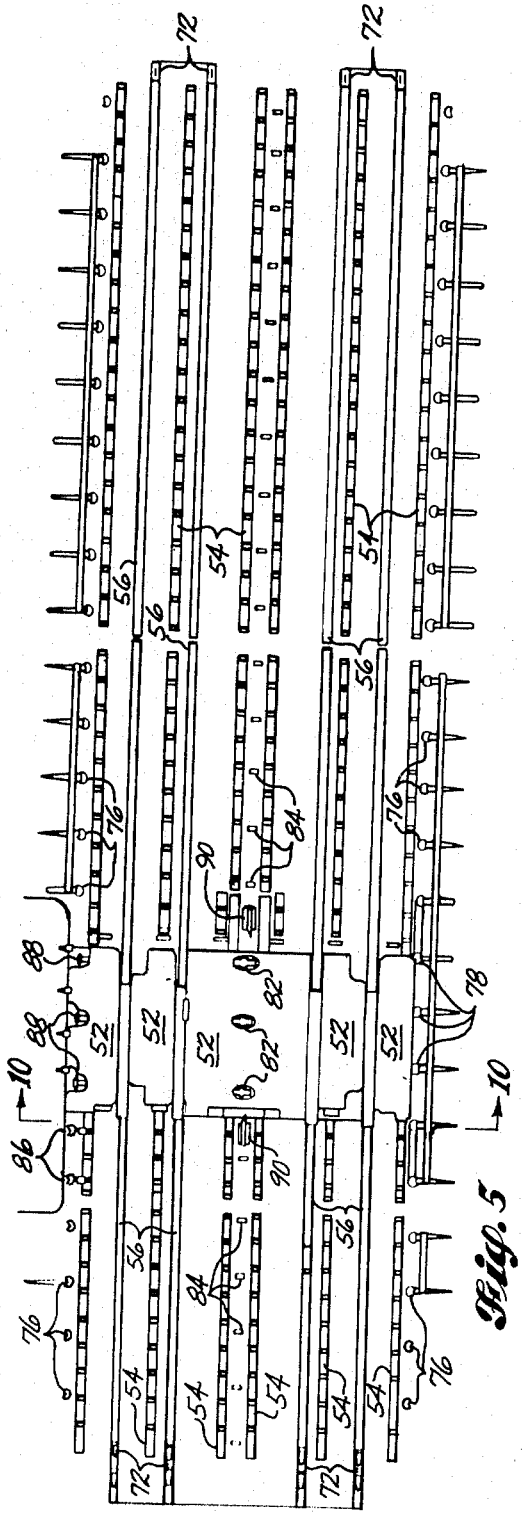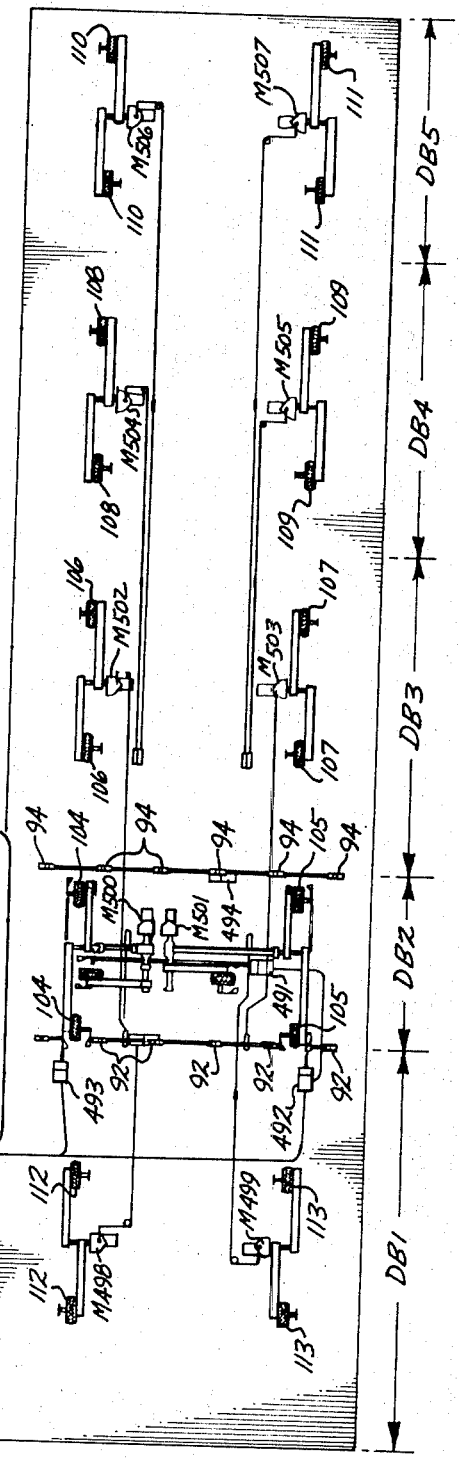

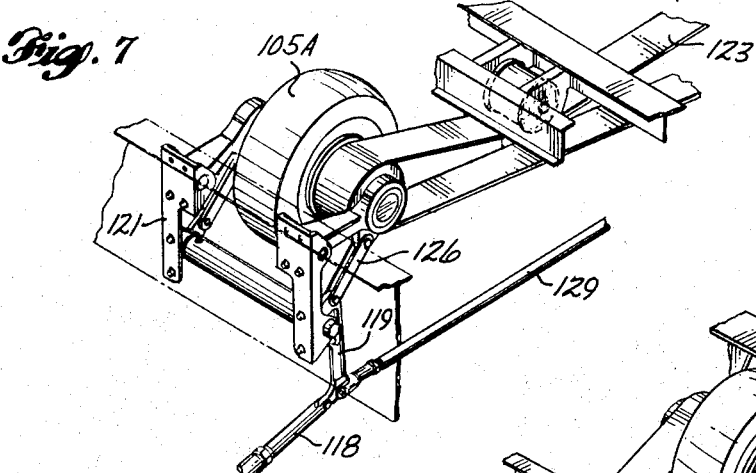
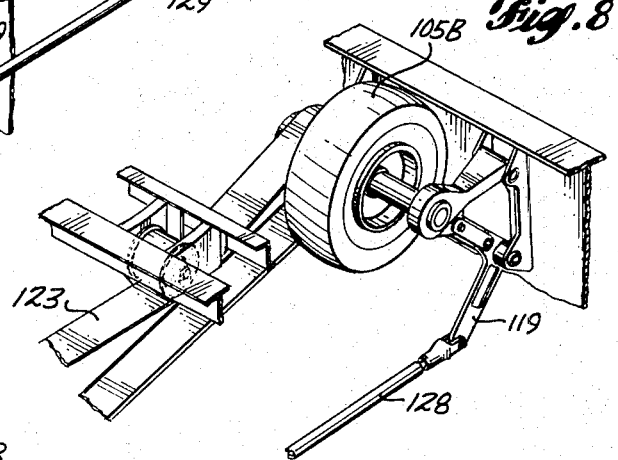
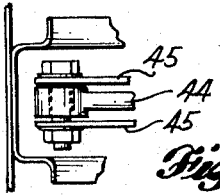
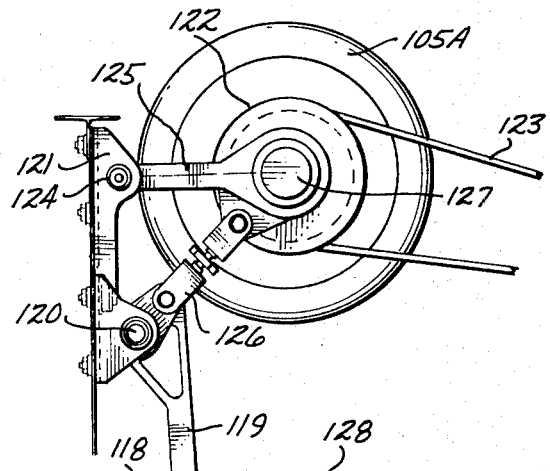
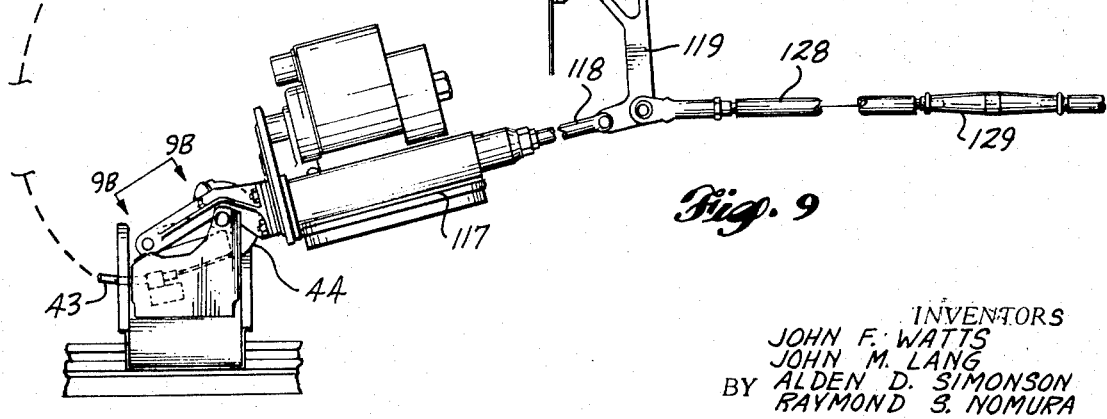

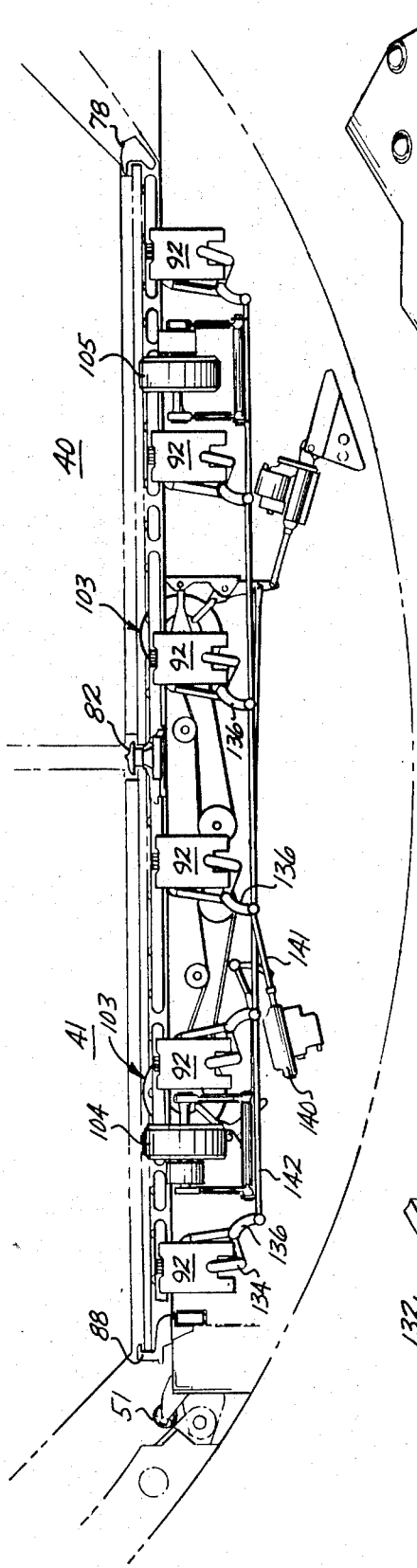
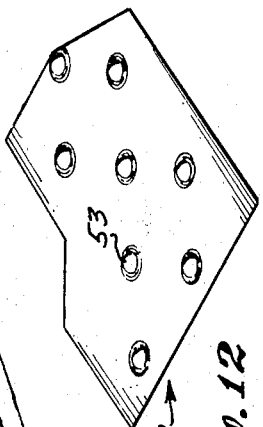
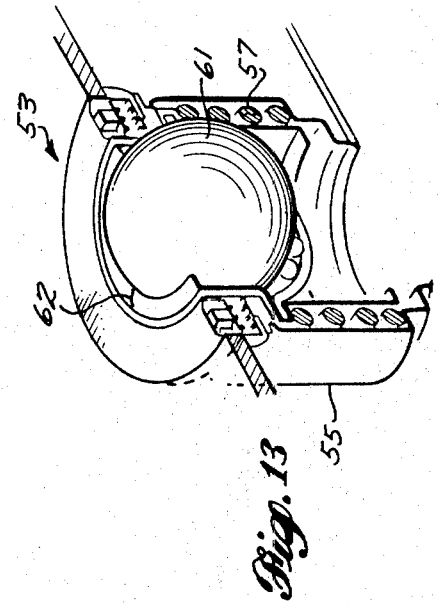
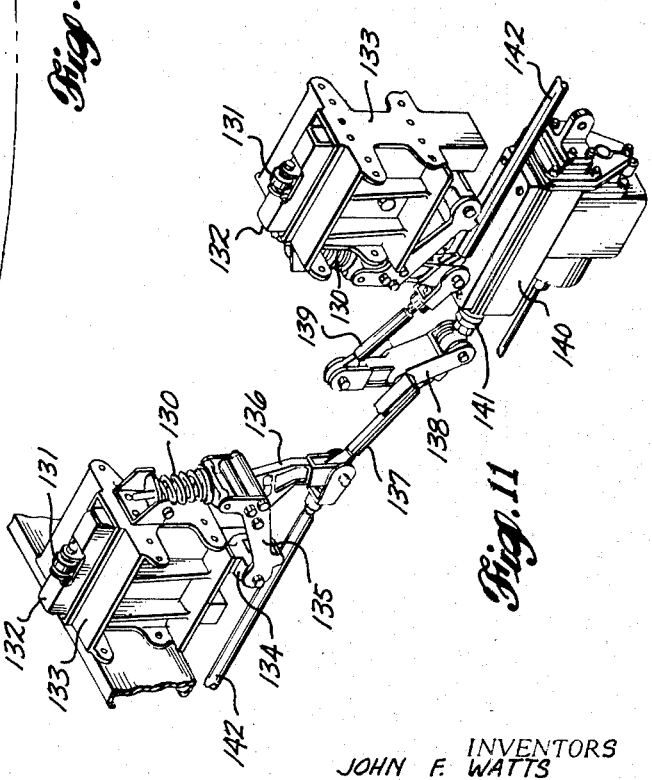

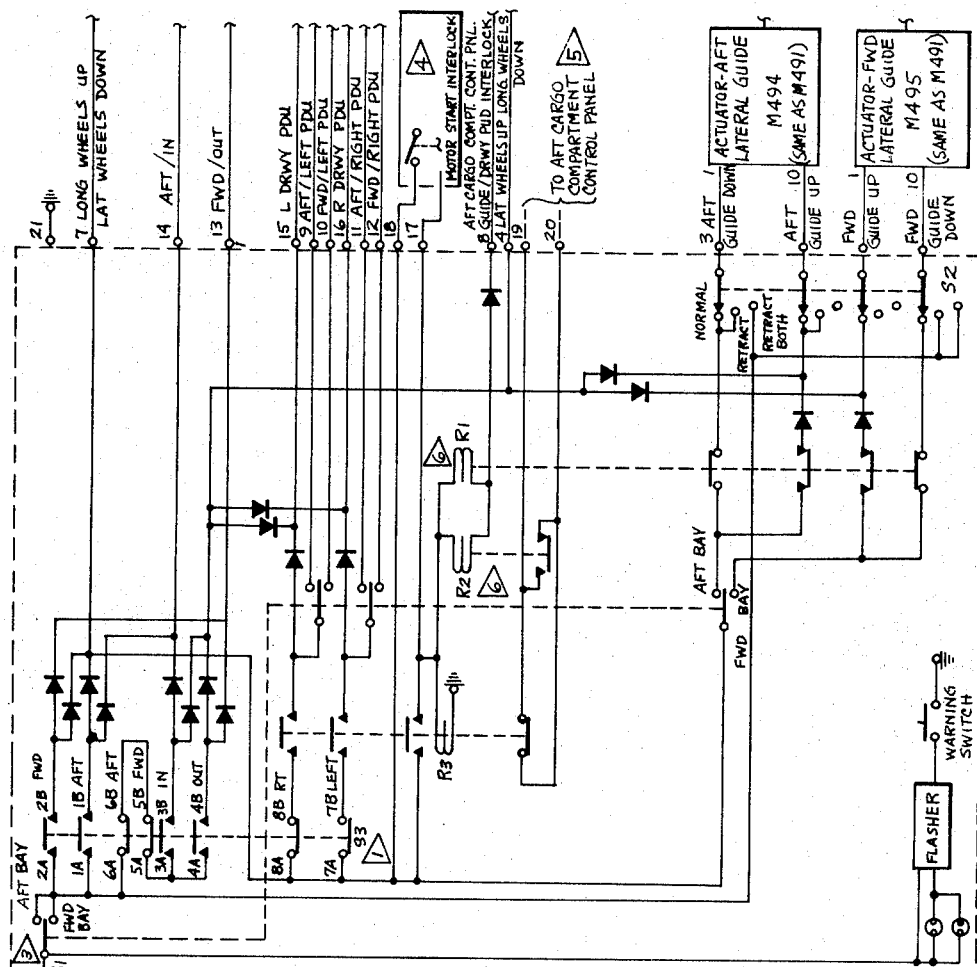
Fig. 26
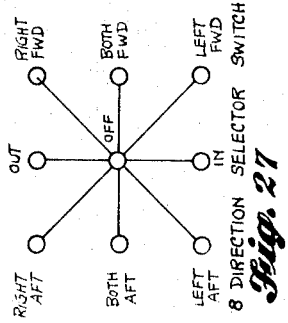
Fig. 27
Fig. 27A

CARGO LOADING SYSTEM FOR AIRCRAFT

SUMMARY OF THE INVENTION

The invention relates to a power driven containerized cargo handling system and more particularly to the design and arrangement of the cargo handling system equipment capable of handling certain intermixing of full or half width containers. The invention is described in a preferred aircraft embodiment with reference to incorporation in a compartment in the forward lower lobe, below the main passenger compartment floor, wherein the compartment is designed to accommodate preloaded half width and/or full width contoured containers in addition to including provisions for optional pallet conveyance and restraint hardware. The compartment houses guides and restraints, omni-directional ball transfer panels and roller trays conveyor system, a power drive system capable of loading or unloading a full complement of containers, and a control system for movement of cargo pallets and baggage containers into, within, and out of the compartment. The containers, moved by the power drive system, enter the compartment over door sill rollers onto ball transfer panels located in the compartment door areas. Movement longitudinally within the compartment is accomplished on the power driven wheel system and on the roller trays. The operation of the system is such that a full complement of contoured containers can be loaded or unloaded, from the compartment by one man within 6 minutes, assuming that compatible container handling equipment is available external to the aircraft.

BRIEF DESCRIPTION OF THE DRAWINGS

FIG. 4 is a perspective view of the interior of the cargo compartment looking aft with reference to the aircraft and compartment shown in FIG. 1.

FIG. 5 is a plan view of the cargo compartment showing the arrangement of the cargo guide and restraining system. Aft in the compartment is to the right in the figure.

FIG. 6 is a plan view of the cargo compartment showing the arrangement of the power drive wheel system and the vertically retractable lateral guide rails in the doorway area.

FIG. 7 is an enlarged perspective view of the left forward longitudinal drive wheel shown in FIG. 3.

FIG. 8 is an enlarged perspective view of the left rear longitudinal drive wheel shown in FIG. 3.

FIG. 9 is an enlarged side view of the left forward longitudinal drive wheel shown in FIG. 3, further depicting the retractable drive wheel linkage and actuator mechanism.

FIG. 9A is a perspective view of the manual retract handles for the retractable power drive wheel system located in the doorway area with a dashed cable connection to the retractable drive wheel linear actuator shown in FIG. 9 to depict its interconnection into the system.

FIG. 9B is a detailed top view of manual release linkage and its interconnection with the retractable drive wheel linear actuator shown in FIG. 9.

FIG. 10 is an enlarged cross sectional view taken in the doorway area looking aft along lines 10—10 as indicated in FIG. 5.

FIG. 11 is a perspective view of a pair of lateral guide rails and their extension and retraction linkage and actuation mechanism.

FIG. 12 is a perspective view of a section of the omni-directional ball transfer panels located in the doorway area wherein the ball units are spaced approximately five inches apart.

FIG. 13 is a detail perspective view partly in cross section of one of the omni-directional ball units.

FIGS. 26 and 26A in combined form show the electrical wiring schematic for the cargo handling system.

FIG. 27 schematically shows the eight positions of the power drive select switch with the center position being the spring loaded neutral or off return position.

FIG. 27A is the truth table or switch contact mode output of the eight position, direction selector switch S3 shown in FIG. 27.

DESCRIPTION OF THE PREFERRED EMBODIMENTS

Figure 1:
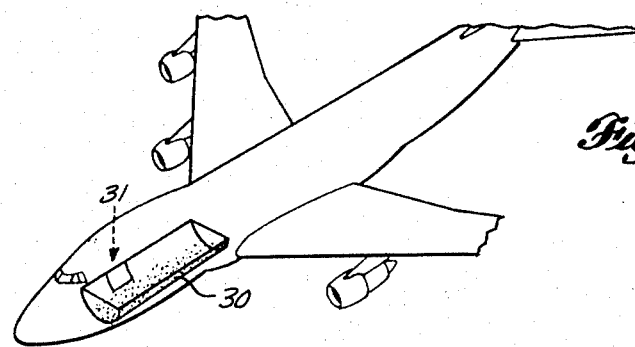
FIG. 1 is a forward perspective view of an airplane and depicts the forward lower lobe cargo compartment area to which preferred embodiment the present invention is directed.

FIG. 1 shows an airplane having a forward compartment 30 in the lower lobe section for half or full width baggage containers and cargo pallet accommodations. The compartment is loaded through a cargo door 31 located on the right hand side of the airplane.

Figure 2:
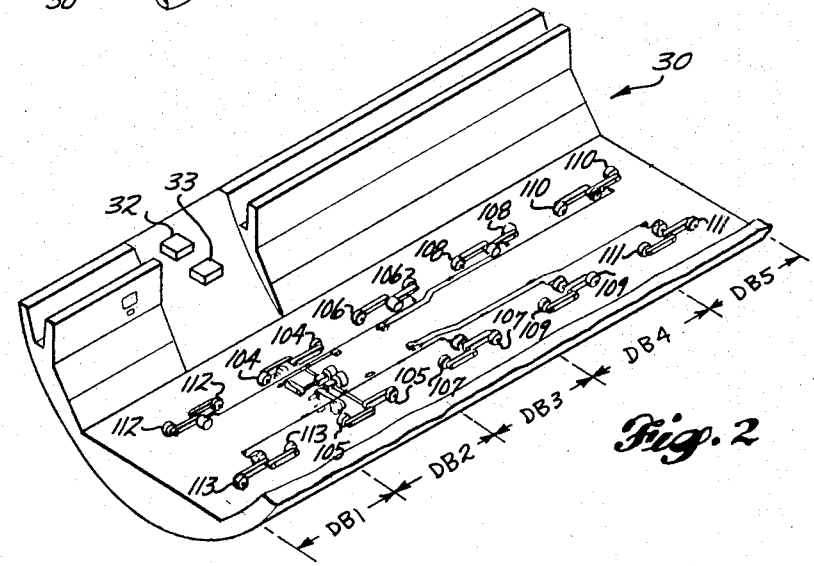
FIG. 2 is an enlargement of the baggage compartment depicting the general arrangement of the power drive wheel system.

FIG. 2 is an enlarged perspective view of the forward baggage and cargo compartment shown in FIG. 1. In the compartment there are three cargo storage areas: the door area; the area aft of the door; and the area forward of the door. The forward cargo compartment 30 is also divided into five areas called drive bay areas and indicated as DB1 to DB5. A drive bay is that area controlled by two power drive units and its associated drive wheels as will be more fully explained hereinafter with reference to FIG. 3. Drive bay 1 (DB1) is forward of the doorway, which is towards the left as shown in FIG. 2, drive bay 2 is in the doorway and drive bays 3, 4 and 5 are aft of the doorway.

Figure 3:
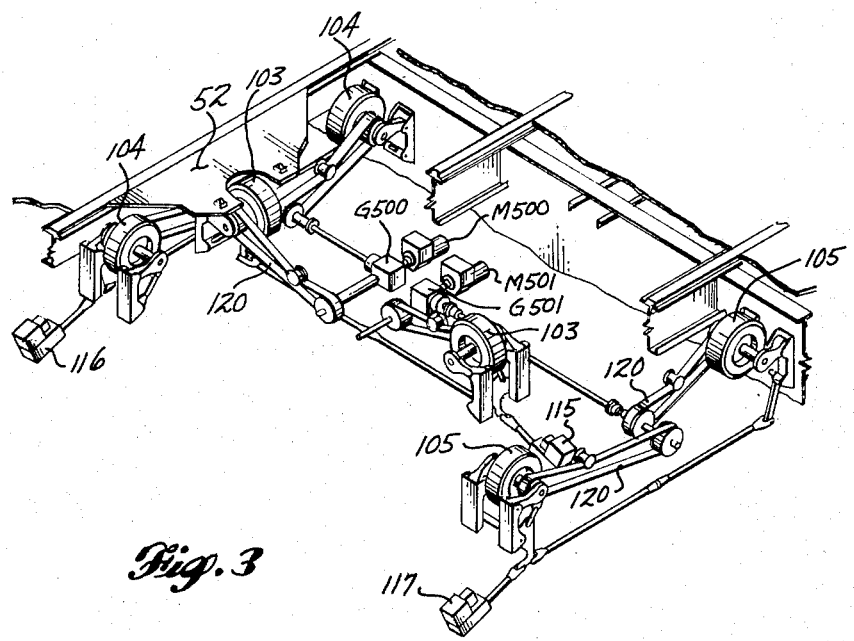
FIG. 3 is an enlarged perspective view of the lateral and longitudinal power drive wheel units located in drive bay 2 in the door area. Forward is downward to the left in the figure.

FIGS. 3, 4 and 6 show the powered retractable drive wheel system.

Figure 26A:
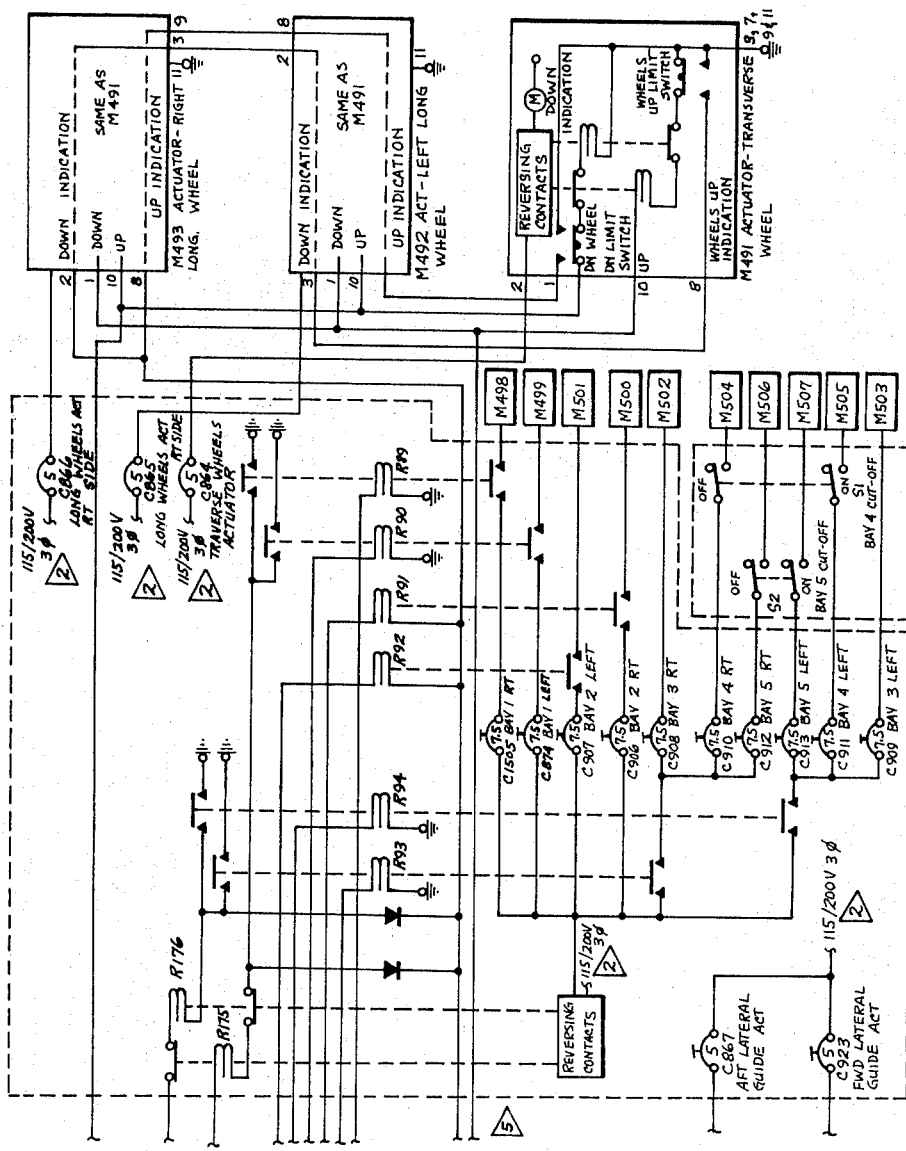

In the door area wherein two drive wheels 103 are positioned to drive laterally and four wheels 104 and 105 are positioned to drive longitudinally. Through operation of the control panel hereinafter described with reference to FIGS. 26 to 27A, either set of drive wheels are either raised or lowered. Also, in conjunction with the operation of the retractable longitudinal drive wheels 104 and 105, the retractable lateral guides 92 forward of the door area and 94 aft are actuated. The drive wheels in both the forward and aft cargo storage areas drive only in a longitudinal direction whereas whose in the door area operate in either direction with either the forward or aft areas. The half width container cargo modules 40 and 41 are driven into storage positions by the fixed longitudinal drive wheels located in the floor.

As shown in FIGS. 2 through 6, in general the cargo compartment 30 contains a cargo handling system, a cargo restraining system and a cargo electrical control handling system. The interaction of these three systems provides for the movement of cargo into, within, and out of the compartment in addition to a holding action required during transportation.

The cargo handling system includes that hardware which propels baggage containers and cargo pallets into, out of, and within the compartment. The cargo handling system consists of electrical drive motors and associated gearboxes, which transmit drive power through neoprene drive belts to pneumatic drive wheels. The drive wheels provide moving power to the base of the cargo container. Actuators located under the ball transfer panels, raise and lower the drive wheels as required to move the cargo containers into and out of, or fore and aft, in the doorway area. The cargo handling system of the present invention permits the rapid handling of cargo by driving the cargo at approximately 50 feet per minute which permits the loading or unloading of a compartment similar to that shown in the illustrated preferred embodiment, within five to six minutes by one man. The preferred embodiment relates to a Boeing 747 type airplane having a forward cargo compartment with floor dimensions of approximately 10 feet in width and 40 feet in length. The system is designed to permit loading or unloading of the right and left sides, when half width containers are used, simultaneously or one side at a time. When the drive system is not in operation, a braking force for the cargo container located within the compartment is provided through the normally engaged brake on each fixed drive wheel power drive unit.

Figure 14:
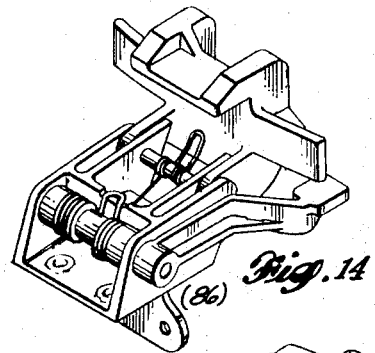
FIG. 14 is a manually retractable door sill restraint.
Figure 23:
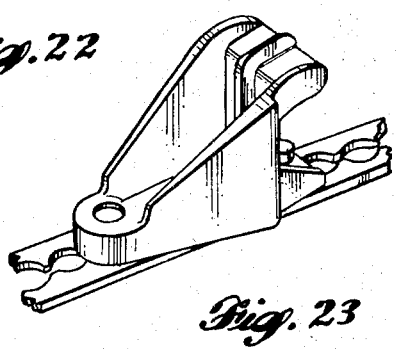
FIG. 23 is a fixed end stop and guide having a vertical restraining lip.
Figure 24:
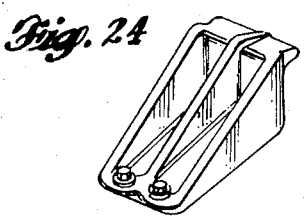
FIG. 24 is another embodiment of a fixed end stop having a restraining lip.
Figure 25:
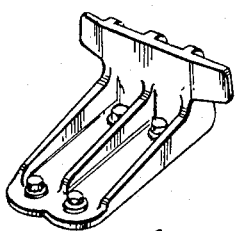
FIG. 25 is a fixed guide.

With reference to FIGS. 4 and 5, the cargo guide and restraining system includes that hardware which guides the cargo containers into and out of the compartment and also restrains it vertically and longitudinally once inside the compartment. The interior area of the lower lobe, forward container compartment is defined as that area forward and aft of the ball transfer area. The system contains impact 78 and roller type 76 lateral restraints and side guides located at spaced intervals down the length of both sides of the compartment and in the door area, interior center guides 84 down the entire length of the compartment, a series of retractable doorway center guides 82 for guiding and restraining half width containers within the compartment, doorsill restraints 88, retractable lateral guide rails 92 and 94, splitter rails 90 and four fixed end stops 72 which are more clearly shown in FIGS. 23 and 24, are located at each end of the compartment to provide longitudinal and vertical restraint. The end stops should be designed to take the total longitudinal load of the containers in the event that one row of the retractable guide rails are inoperative. The two manually retractable door restraints 86 more clearly shown in FIG. 14, are located in the cargo door opening forward of the ball transfer system and are considered as being within the interior area of the compartment. Four cargo tracks 56 are provided down the full length of the compartment to provide the means for installing the locks used for pallet restraint purposes.

The majority of the guide and restraining system components may be positioned in the retracted position by a manual release lever, and in the extended position by hand. Care should be exercised when retracting the components as they are spring loaded to the retract position. The lateral guide rails are normally power operated, but may be manually positioned as hereinafter described with reference to FIGS. 10 and 11.

The doorway area is that area adjacent to the clear opening as defined by the omni-directional ball transfer panels 52 and those restraints immediately adjacent to the ball transfer panels. Included within this area are doorway restraints which are both retractable and non-retractable, retractable lateral guide rails 92 and 94, side guides 86 and 88 opposite the door opening, and retractable center guides 82.

Figure 17:
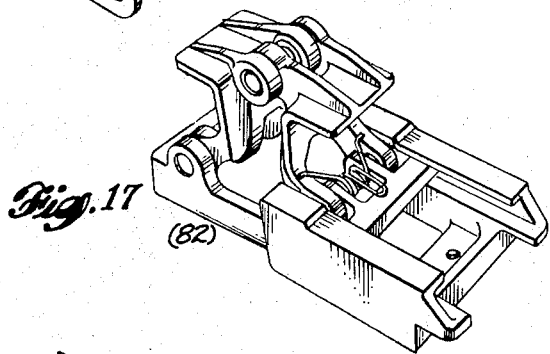
FIG. 17 is a manually retractable center guide positioned in the doorway area.
Figure 20:
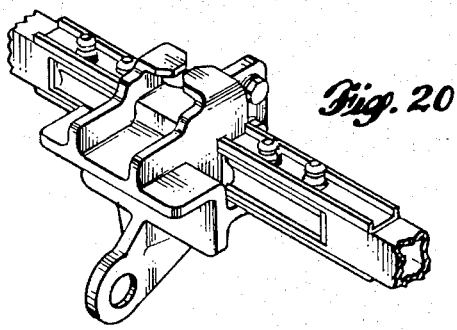
FIG. 20 is a side guide for the doorway area.
Figure 21:
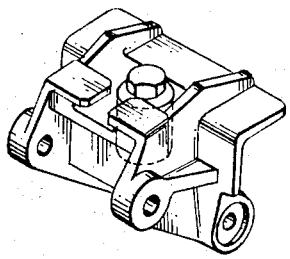
FIG. 21 is a roller side guide.
Figure 22:
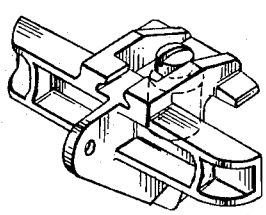
FIG. 22 is a roller side guide with a lateral extension of the impact surface area.

Three side guides 78 which are more clearly shown in FIG. 20, are located opposite the compartment door, adjacent to the ball transfer panel 52. The guides are so constructed as to withstand the impact of containers moving into the compartment and act as a guide for containers moving in a longitudinal direction. They also provide vertical and lateral restraint of the container. Three retractable center guides 82 which are more clearly shown in FIG. 17 are located in the door area to provide an index and stop for half width containers entering the compartment which are to be positioned on the right side of the airplane. They also provide vertical and lateral restraint at the centerline of the airplane for half width containers and act as a guide for half width containers being moved in the longitudinal direction.

Figure 18:
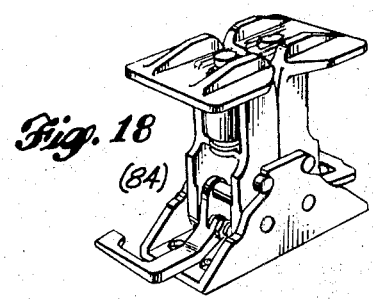
FIG. 18 is a manually retractable center guide positioned in the interior compartment area.
Figure 19:
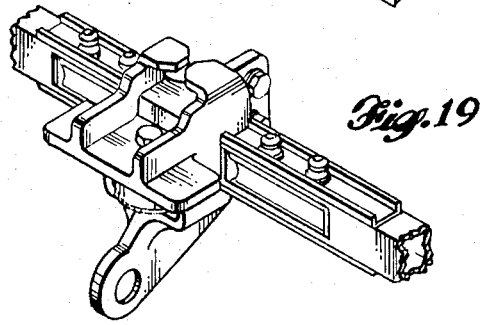
FIG. 19 is a side guide or a cargo container guide having a roller in contact with the container and positioned along the sides of the compartment interior.

Also in the interior area, individual and manually retractable center guide units 84 are positioned down the center of the compartment. These units are spaced on approximately 20 inch centers and act as guides for half width containers being moved longitudinally within the compartment and also provide vertical and lateral restraint along the compartment centerline for the half width containers. Each retractable center guide 84 as more clearly shown in FIG. 18, includes rollers to permit ease of movement of the containers longitudinally within the compartment. These center guides are spring loaded in the down position and are manually lowered individually as required to allow the installation of full size containers.

As the cargo containers are loaded into or out of the compartment they are restrained and guided by the retractable lateral guide rails 92 and 94 in the doorway area. The doorway guides 82, interior center guides 84 and side guides 76, guide the cargo during movement in the compartment and restrain it once it is in the desired position. The retractable lateral guide rails 92 and 94, and compartment end stops 72 provide longitudinal restraint. Also, longitudinal restraint hardware is located to provide clearance between adjacent container bases and clearance between container base and system hardware.

Figure 15:
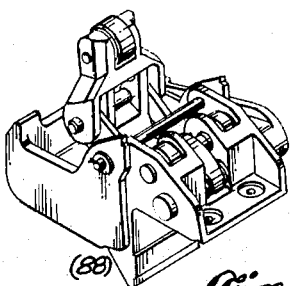
FIG. 15 is a semi-automatic retractable door sill restraint.

The compartment has five retractable door restraints located adjacent to the compartment door opening. The vertical and horizontal restraint lips of the three restraints 88 in the door area adjacent to the ball transfer panel, are individually retractable to permit loading and unloading of the cargo containers. In the up position, the retractable door restraints 88 which are more clearly shown in FIG. 15, provide lateral and vertical restraint to the cargo containers located in the door area on the ball transfer panel. Two additional, non-retractable door restraints 86 which are more clearly shown in FIG. 14, are located adjacent to the walkway in the doorway. These restraints act as a guide for containers being moved in the longitudinal direction as well as providing lateral and vertical restraint.

FIGS. 10 and 11 show in greater detail the retractable guide rails which provide lateral guiding for containers being moved into and out of the compartment in the door area. In addition, they provide longitudinal restraint to the containers located in the compartment. The guide rail 132 is vertically supported for sliding movement within the guide support housing 133 and through the guide rail link 134, arm 135, crank arm assembly 136 and spring 130, the retractable guide rail is spring loaded in the up position and raised and lowered by means of linear actuator 140. The guide rails 132 are sequenced through guide rod linkage 142 for extension or retraction by linear actuators 140 which are further sequenced through the electrically powered loading or unloading drive select switch. The six guide rails 92 shown in FIG. 10 are located forward of the ball transfer mat with a similar set of six rails 94 located on the outer side or aft of the ball transfer mat. Each set of six guide rails is raised or lowered by a single electrically operated linear actuator. In case of failure, the linear actuators may be operated by a mechanical override system.

In general, the conveyor system comprises those components of the lower lobe cargo and baggage system which permit movement of containers into, within and out of the compartment. Included are the ball panel transfer system 52 located in the door area, the roller trays 54 extending longitudinally forward and aft into the compartment interior, splitter rails 90 located adjacent to the ball transfer panels, and sill rollers 51 located in the sills of the compartment.

As shown in FIGS. 12 and 13, omni-directional container movement is provided in the door area of the compartment through the use of ball transfer panels. The panels include 1 inch diameter balls, spring loaded to 100 pounds and arranged generally in a 5-inch grid pattern. In detail, as shown in FIG. 13, the ball unit installation comprises a retainer or housing 55 containing a spring 57 which acts against the flange of a disked container 59. The ball bearings 60 are in supporting contact with the under surface of ball 61. The ball is retained within the assembly by the wiper ring 62. The ball unit is recessed and retained in the ball mat panel by a spring lock 63.

Four sill rollers 51 are located in the door sill of the compartment. These rollers provide a rolling surface at the sill for containers moving into and out of the compartment. The rollers will provide an assist in those cases where ground handling equipment does not properly mate with the airplane door sill.

Six rows of roller trays 54 permit the movement of containers longitudinally within the container compartment.

Figure 16:
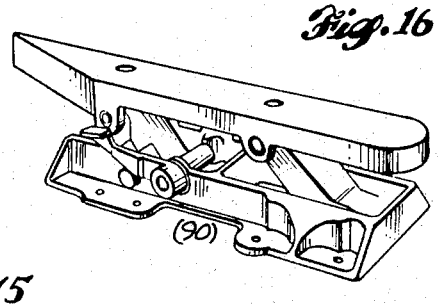
FIG. 16 is a manually retractable splitter rail.

Two retractable splitter rails 90 are located, one on each side of the ball transfer panels 52 in the door area of the compartment, on the airplane centerline. As more clearly shown in FIG. 16, the splitter rails are spring loaded in the down position and when in the raised position, provide a separating and positioning action to half width containers moving longitudinally into the compartment. The splitter rails separate the half width containers when they are handled in pairs and guides the container to a position between the interior center guides 84 and the side guides 76. If full width containers are used, the splitter rails are lowered along with the retractable center guides 84.

The power drive system as shown in FIGS. 2, 3, 4, 6 and 7 to 10, includes that hardware which propels the cargo containers laterally into and out of the lower lobe compartment and propels the containers longitudinally within the compartment. The power drive system comprises electrical drive motors M498 M507 and associated gear boxes G498 to G507, respectively, which transmit driving power through toothed neoprene drive belts 120 to pneumatic drive wheels 104 to 113. The drive wheels provide moving power to the bases of the cargo containers. The power drive system propels the containers at a speed of approximately 9 inches per second laterally in and out of the compartment. Longitudinal movement is 10.5 inches per second over the ball transfer panels in the door area and 9 inches per second in the interior area of the compartment.

The power drive system permits loading or unloading of a compartment within 6 minutes by one man. The system is so arranged as to permit loading or unloading of the right and left sides of the compartment simultaneously or one side at a time while the containers on the opposite side remain stationary. When not in operation, the power drive system provides a braking force for the containers located within the compartment.

The electrical power source for the power drive system is from the airplane electrical distribution system through a cargo door open electrical interlock arrangement.

As more clearly shown in FIG. 3, the retractable drive wheels in the door area provide lateral or longitudinal motion to the cargo containers. Two drive wheels 103 are used for lateral movement and four, 104 and 105 drive wheels are used for longitudinal movement. The two lateral drive wheels 103 are raised or lowered by a single actuator 115 controlled by the cargo system drive select switch. The two sets of longitudinal drive wheels 104 on the right side and 105 on the left side of the aircraft. Since FIG. 3 is a forward perspective view, the forward direction of the aircraft is downward to the left. The right side longitudinal drive wheels 104 are raised or lowered by linear actuator 116 and the left side longitudinal drive wheels 105 are raised or lowered by linear actuator 117. For a clearer understanding of the operation of the power drive means, FIGS. 7 through 9 will be referred to which depict the pair of longitudinal drive wheels 105 and their drive means and retraction mechanism. The retractable drive wheel linear actuator 117 is mounted at one end to aircraft structure through a manual retract cable actuated linkage mechanism and at the other end through actuator push rod 118 to bell crank arm 119, which in turn is pivotally mounted at 120 to airplane structure through mounting bracket 121. Actuation of the linear actuator 117 to lower the drive wheel assembly 105A, comprising: the pulley 122 driven by a neoprene toothed drive belt 123 about the fixed pivotal connection 124 through radius arm 125; will rotate the bell crank arm 119 clockwise about fixed pivotal connection 124 through the interconnection of the adjustable bell crank link 126, lower the rotational axis 127 of the wheel. Through the extension retraction linkage 128, adjustable in length by turnbuckle barrel 129, the other longitudinal drive wheel 105B, shown in FIG. 8 is similarly actuated. The manual retract assembly 42 located just forward of the doorway, connects to the drive wheel actuators under the ball transfer panels 52 in the doorway area. A retraction cable 43 attached to the actuator rear mount, causes the actuator to reposition when the handle is pulled upward. Repositioning of the actuator moves a linkage connected to the drive wheels and causes them to retract. The actuator may be returned to its normal position either manually or electrically by the control joystick.

The manual retract mechanism for the drive wheel assembly as shown in FIGS. 9, 9A and 9B comprises the manual disconnect assembly or retract handles 42 with the flex-shaft cable 43 connected to the release link 44 which through the actuator latch 45, latch pin 46 and actuator bracket 47 permits the structurally supported end of actuator 117 to move and thereby lower the wheel assembly.

One manual disconnect assembly is attached to each power drive unit that drives a fixed wheel assembly. Raising the lever to the up position releases the clutch in the power drive unit gearbox and allows the wheel to rotate freely.

These actuators are also controlled by the cargo system select switch. Movement of the select switch to various positions actuates certain linear actuators and permits the movement of half width or full containers to various positions.

Also, in case of system or power failure, a manual override control, attached to each linear actuator, trips the actuator into a retract position lowering the lateral and longitudinal drive wheels located in the door area.

The drive wheels located in the interior area of the compartment provide longitudinal motion to the containers. Typically, two drive wheels located on the same side of the compartment, are driven by a single drive motor-gear box-belts assembly. Operation of the drive systems depends upon the positions selected for the switches located in the control panel.

In the case of system or power failure, a manual override control, attached to a lever on the power drive units, actuates a declutching system in the gearbox thereby permitting freewheeling of the wheels.

The control system for handling the cargo power drive system comprises a control panel 32, a power disconnect panel 33.

The control panel 32 is located in the doorway 31, inside the cargo door opening, in the upper forward area. It contains the switches and control stick needed to activate the system, select the position of the guide rails, select the direction of cargo movement and also capable of selecting the area within the compartment to be loaded.

The control panel also contains a lighted push button switch which is used as a warning device for the protection of personnel working in the compartment when the cargo system is energized. When pushed, this switch activates a flashing light within the switch which warns that personnel may be working in the cargo compartment.

Power to the compartment power drive system is obtained from the airplane electrical system through an electrical interlock which precludes the operation of the cargo system unless the cargo compartment door is in the full open position.

As shown in the schematic electrical diagrams of FIGS. 26, 26A, 27 and 27A, the control panel 32 contains: a system operation switch to control power to the cargo handling system; a drive select switch of the joy or control stick type to control the movement of the containers within the compartment; a mode of operation or guide rail selector switch in case palletized cargo handling is desired; and two override power bay cutoff switches also for use during the handling of palletized cargo.

The drive select switch FIG. 27 is an eight position, momentary on, joy or control stick type and by placing the control stick in various positions controls the movement of the cargo containers laterally into and out of the compartment or longitudinally within the compartment and also permits the movement of half width or full width cargo containers to or from the various locations within the compartment.

The mode of operation or guide rail selector switch 52 is a three-position switch which is used to determine the mode of operation of the retractable guide rails in the door area of the container compartment. One position of the switch permits normal operation of both rows of retractable guide rails. This position is the normal position during the handling of half width or full width cargo containers. A second position of the switch retracts the forward row of retractable guide rails, keeping the aft row in normal operation. This positioning of the switch would also be required when the containers or pallets are wider than the standard 5 foot size. The third position of the switch lowers all retractable guide rails in the door area to permit the loading of special cargo items.

The two override power bay cutoff switches Bay 4 cutoff and Bay 5 cutoff, are used for removing power to the drive wheel components located in the two innermost drive bays of the compartment. The compartment as previously described, is separated into drive bays according to the grouping of power drive units. The bay cutoff switches are used for cutting off power to the drive wheel components in bays 4 and 5 which permits unloading of the drive bays near the doorway without disturbing the payload in the drive bays nearest the wing root and also permits the loading of cargo pallets or nonstandard sized baggage containers into the innermost part of the compartment. Also, once the pallets or containers are positioned, this override and power shutoff capability prevents the drive wheels from turning against the positioned pallet or container bases as additional pallets or containers are moved into or out of the compartment. These same bay cutoff switches may also be used during the loading of standard contoured containers to minimize excessive operation of the wheels and drive units when they are not needed.

FIGS. 26, 26A, 27 and 27A; the following is a functional description of the electrical schematic of the cargo handling system: The cargo handling system may be used to handle containers, pallets or special cargo. The only step required to change from one type package to another is to change the position of the lateral guide rails switch. The system controls are operated by 28-volt d.c. power; the power drive units motor and the extension/retraction actuators motor are operated by 115-volt, 400-Hz, three-phase a.c. power. All power for the system is taken from a ground handling bus. The 28-volt d.c. power for the controls is routed from the ground handling bus through the UP side of the cargo door switch. This switch acts as a safety device against cargo movement without adequate doorway clearance.

When the power drive system switch located on the control panel is placed in the ON position, 28-volt d.c. power is applied to the joy stick and the lateral guides switch on the control panel. When the joy stick is moved to one of the decaled positions, 28-volt d.c. is applied to the power drive unit motor relays and to the extension/retraction actuator through the extend/retract relays located in the actuator. The appropriate fixed drive units rotate immediately if the retractable wheels are correctly positioned. On the retractable units, the extend/retract relays close the switches in the actuator, as required, applying 115-volt, 400-Hz, three-phase a.c. power to the actuator motor. The actuator motor drives the actuator acme screw which drives the wheel or guide rail assembly to the selected position and closes the limit switch. Closure of the limit switches in the lateral and longitudinal retractable drive wheel assembly actuators supplies a ground for the power drive unit motor relay. When the power drive unit motor relays close, 115-volt, 400-Hz, three-phase a.c. power drives the power drive unit in the correct direction. The lateral guides switch, on the control panel, determines the extend or retract position of the guide rails. If the lateral guide switch is in NORMAL and the joy stick selects any position other than IN or OUT the lateral guide rails will retract, then extend again. A 1.5 to 2.0 second time delay relay receives 28-volt d.c. power from the joy stick contacts, creating the cycle action.

Additional controls for the power drive units in bays 4 and 5 are located on the power disconnect panel. Placing these switches in the OFF position removes the 115-volt 400-Hz, three-phase a.c. power from the motor and stops the unit rotation. A control interlock receives 28-volt d.c. power from the joy stick in one compartment to time delay relays in the control panel of the other compartment to prevent circuit overload. If both joy sticks are activated at the same time the time delay relays in the second circuit activated will hold the circuit open for 1.5 to 2.0 seconds. This time delay allows circuit one to reduce from a surge to an operating power level. Release of the joy stick to the center position deactivates the cargo handling system and stops all movement.

LOADING OPERATION — In general, the operational procedure of the cargo handling system of the present invention for loading containers in the compartment of the aircraft is as follows. The cargo compartment door is fully opened and the external cargo loaded platform is positioned outside the door, level with the conveyor plane including the door sill and ball mat in the door area. The loader platform guides should be in alignment with the lateral guides in the door area of the compartment. In preparation for loading the containers, the door sill restraints should be in the partially extended position wherein the guide is in the up position. The guide is spring loaded to flip down in one direction as the incoming cargo container pushes against it and return to the vertical position to act as a guide, after the container has passed thereover. The doorway center guides should be in the retracted position. The interior center guides should be in the extended or upright position. The splitter rails should be extended or lifted up until they are in the locked up position. The side guides on the left side of the ball mat and the side guides on both sides of the interior of the compartment should be extended or the restraint lip of the side guide raised up and locked in the up position. In order to transfer a pair of half width containers to the right and left hand side of the compartment respectively, for stowage to the rear of the aft compartment the control panel personnel warning light should be checked to see whether the caution light is flashing to indicate personnel in the compartment, before operating the cargo handling control panel position switches. The power drive system two position toggle switch S1 should be positioned so as to direct power to the aft drive wheel units and cutoff power to the forward drive wheel units. The lateral retractable guides within the ball mat door area should be extended or raised by placing the rotary switch S2 in the normal position which positions both transverse sets of the guides, fore and aft of the ball mat, in the upright position. The two toggle switches for directing power to each of the non-retractable drive wheel units in bays 4 and 5 are turned to the on position.

With a pair of half width containers back to back on the external cargo loader, the loader is actuated to power the first container through the entrance of the doorway, over the doorsill guides, to a position where the first lateral drive wheel within the compartment nearest the door is in engagement with the undersurface or base of the cargo container.

The drive select switch or joy stick has to be held in the direction of desired container movement. Therefore, by moving the joy stick to the in position: the longitudinal drive wheels in the door area will lower if they are not already in the lowered position; the lateral drive wheels will rise if not already in the raised position; the lateral retractable guides will rise if not already in the raised position; and the lateral drive wheels, when fully raised, will rotate in the inbound or loading direction thereby transferring the container from the cargo loader laterally across the ball mat area and against the left impact side guides. After the doorsill guides pop up behind the second container, the joy stick can be released to return to the neutral position and thereby stop the lateral drive wheels from turning.

In order to move the containers longitudinally inside the compartment, the joy stick is moved in the direction that the containers are to move in leaving the door area. For moving the containers longitudinally aft from the door area, the joy stick is moved to the aft position whereby: the lateral retractable guides aft of doorway will lower; the lateral drive wheels in the door area will lower; the longitudinal drive wheels in the door area will rise; the longitudinal drive wheels in the door area, when fully raised, will rotate in the aft or cargo loading direction; the longitudinal drive wheels aft of the door area in bays 4 and 5 will rotate in the aft or loading direction; after a less than 3 seconds time delay, the lateral guides aft of the doorway will be positioned to be raised but because they are spring loaded in the up position, they will remain in contact with the undersurface of the containers until they are past the lateral guides and then spring to the up position.

Once the first pair of containers are past the lateral guides a second set of containers can be positioned from the cargo loader laterally across the ball mat area and against the left impact side guides. This procedure can be repeated until the pairs of containers travel in a longitudinal train aft to their stowage position.

We claim:

1. A cargo container handling system for a cargo storage compartment, comprising:
    a. a control system for operating
        1. a power drive system, and a cargo container guide
        2. and restraint system;
    b. said power drive system incorporating a plurality of selectively powered drive wheel units installed at predetermined locations in said compartment for engaging the base of the cargo container to propel the cargo container laterally and longitudinally within said compartment;
    c. said cargo container guide and restraint system incorporating selectively controlled lateral guide rail units installed at predetermined locations in said compartment for guiding the cargo containers laterally into said compartment and for restraining the longitudinal movement of the cargo container within said compartment; and
    d. switching means in said control system for selectively operating said powered drive wheel units and said lateral guide rail units in a coordinated procedure for moving and positioning the cargo container in said compartment.

2. The cargo handling system as claimed in claim 1 wherein each said power drive system selectively powered units comprises
    a. a motor with drive means,
    b. cargo drive wheels connected to said drive means for imparting motion to associated cargo engaged therewith, and
    c. means for disengaging and engaging said drive wheels from and to said cargo.

3. The cargo handling system as claimed in claim 2 wherein said motor and said means for disengaging and engaging of said drive wheels from and to said cargo of a selected power unit are activated by selective setting of said switching means in said control system.

4. A cargo handling system in an aircraft compartment comprising:
    a. a control system for operating a power drive system, and a restraint system;
    b. said power drive system incorporating a plurality of selectively powered units installed at predetermined locations in said compartment;
    c. each of said powered units comprises a motor with drive means, cargo drive wheels connected to said drive means for imparting motion to associated cargo engaged therewith, and means for disengaging and engaging said drive wheels from and to said cargo;
    d. said restraint system incorporating selectively controlled guiding and restraining means installed at predetermined locations in said compartment;
    e. switching means in said control system for selectively operating said drive units and said guiding and restraining means to move and position cargo in said compartment;
    f. said motor and said means for disengaging and engaging of said drive wheels from and to said cargo of a selected power unit being activated by selective setting of said switching means in said control system; and
    g. said switching means comprises an eight-position arrangement for control of said associated cargo in said compartment.

* * * * *